(12) United States Patent
Al Marzouqi et al.

(10) Patent No.: US 10,611,893 B2
(45) Date of Patent: Apr. 7, 2020

(54) METHOD FOR OBTAINING PAPER FROM SAND AND PRODUCTS OBTAINED THEREFROM

(71) Applicant: United Arab Emirates University, Al Ain (AE)

(72) Inventors: Ali H. Al Marzouqi, Al Ain (AE); Sidra Siraj Ahmed, Al Ain (AE); Sumiyya Faheem Rabbani, Al Ain (AE); Hamda Juma Al Zarry Al Mesmari, Al Ain (AE); Sara Helal Rubayea Al Ketbi, Al Ain (AE); Nour Shehadeh Hussein Abdel Rahman, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 60 days.

(21) Appl. No.: 15/954,167

(22) Filed: Apr. 16, 2018

(65) Prior Publication Data
US 2019/0315940 A1    Oct. 17, 2019

(51) Int. Cl.
| | |
|---|---|
| *C08K 3/36* | (2006.01) |
| *C08F 10/02* | (2006.01) |
| *C08L 23/06* | (2006.01) |
| *C08J 5/18* | (2006.01) |
| *C08J 3/20* | (2006.01) |

(52) U.S. Cl.
CPC ............... *C08K 3/36* (2013.01); *C08F 10/02* (2013.01); *C08J 3/203* (2013.01); *C08J 5/18* (2013.01); *C08L 23/06* (2013.01); *C08J 2323/06* (2013.01); *C08J 2429/04* (2013.01); *C08J 2481/06* (2013.01); *C08K 2201/005* (2013.01); *C08L 2207/062* (2013.01)

(58) Field of Classification Search
CPC ..... C08K 3/36; C08K 2201/005; C08F 10/02; C08J 5/18; C08J 3/203; C08J 2323/06; C08J 2429/04; C08J 2481/06; C08L 2207/062
USPC ........................................................ 524/493
See application file for complete search history.

(56) References Cited

U.S. PATENT DOCUMENTS 3,579,372 A * 5/1971 Healy ..................... D06N 3/14
427/541

* cited by examiner

*Primary Examiner* — William K Cheung
(74) *Attorney, Agent, or Firm* — Hayes Soloway PC (57) ABSTRACT

The present disclosure relates to an eco-friendly sand-made paper and a method of manufacturing thereof. In an aspect, the proposed sand-made paper can be obtained/manufactured through a method comprising the steps of treating a polymer with a solvent so as to obtain solvent treated polymer; and processing said solvent treated polymer with fine powdered sand optionally with a binder to yield said sand-made paper.

24 Claims, 7 Drawing Sheets

METHOD FOR OBTAINING PAPER FROM SAND AND PRODUCTS OBTAINED THEREFROM

FIELD

The present disclosure relates to a sand-made paper and manufacturing method thereof, and more particularly to an eco-friendly sand-made paper and a method for making the same.

BACKGROUND

Existing pulp and paper industry utilizes wood as a raw material in order to manufacture pulp, paper, paperboard, and other cellulose-based products. Environmental impact generated by such manufacturing of pulp and paper results mainly from wood pulping and pulp bleaching, wherein in existing pulping processes, sulfur compounds and nitrogen oxides are emitted to the air, and during pulp bleaching, chlorinated and organic compounds and nutrients are discharged as waste water, which is one of the major source of pollution. Chemical pulping is the main source for air emissions in the pulp and paper industry, mainly due the fact that chemical pulping is operating at higher temperatures.

Existing mechanisms of pulp and paper manufacturing require a large amount of water to be processed, leading to wastewater being discharged at a rate of 20-100 cubic meters per metric ton of product (Gavrilescu et al., 2008).

Wastewater is high in biochemical oxygen demand (BOD), total suspended solids, chemical oxygen demand (COD), nitrogen and phosphorus. In addition, chlorinated organic compounds such as dioxins, furans, and other absorbable organic halides (AOX), that represent 0-4 kg/t of pulp are also generated using existing paper manufacturing processes.

In addition, pulp manufacturing generates large quantity of solid wastes including wood waste (mainly bark), sodium salts from recovery boiler, pulp screening rejects and dregs and grit from causticizing plant. In addition, ashes are generated during burning of wood wastes and sludges (Gavrilescu, 2004).

Even fundamentally, rise in global environmental issues such as deforestation due to dependence on wood for pulp and paper manufacturing, air and water pollution, climate change, overflowing landfills, and clear cutting have all led to increased government regulations. There is now a trend towards reducing water use, greenhouse gas emissions, fossil fuel consumption, and clean up its impacts on local water supplies and air pollution. One of the key objectives in recent times has been achieving sustainability in the pulp and paper industry to reduce clear cutting in order to minimize the deforestation of trees. Conventional paper can only be recycled few times and each time for manufacturing paper, fresh paper needs to be added, increasing demand of wood, leading to more cutting of trees and further speeding up deforestation.

There is therefore a need in the art for a completely unique method to manufacture paper that helps overcome at least the above-mentioned issues and disadvantages in existing methods, including the raw material used for manufacturing paper. Thus, there is also an urgent unmet need of an alternative material to obtain paper, a material which is sustainable resource with lesser harmful environmental effects and more particularly an alternate resource for making paper which is easily available especially in dry and arid desert regions.

SUMMARY

The present disclosure relates to a sand-made paper and manufacturing method thereof.

Accordingly, in a general aspect the present disclosure relates to an eco-friendly sand-made paper and a method for making/manufacturing the same.

In an aspect, the present disclosure relates to a method for making/manufacturing sand-made paper, the method comprising the steps of: treating a polymer with a solvent so as to obtain a solvent treated polymer; and processing the solvent treated polymer with fine powder like sand optionally with a binder to yield the sand-made paper.

In an alternate aspect, the method of making/manufacturing the sand-made paper comprises pelletizing and rolling of fine powder like sand and polymer optionally with a binder to provide one or more sand-made paper sheet(s).

In an aspect, the fine powder like sand can be obtained through sieving of naturally occurring sand, wherein the naturally occurring sand can be any or a combination of brown sand, white sand, grey sand, red sand or the like. In an aspect the naturally occurring sand, can be any or a combination of brown sand, white sand, grey sand, and red sand.

In another aspect, the polymer can be in a form selected from any or a combination of powdered polymer, processed polymer, and polymer pellets. In another aspect, the polymer can be selected from any or a combination of polyethylene, and high density polyethylene (HDPE).

In yet another aspect, the solvent can be selected from any or a combination of toluene and acetone.

In an exemplary aspect, the solvent can be toluene and the polymer can be powdered HDPE.

In an aspect, the fine powder like sand and the solvent treated polymer can be processed in a ratio ranging from 80:20 to 30:70. In an exemplary implementation, the fine powder like sand and the solvent treated polymer can be processed in a ratio of around 50:50.

In an aspect, the binder can be selected from any or a combination of polyvinyl alcohol, polyethersulfone, sorbitan monooleate, and silica.

In another aspect, the method can further include the step of pre-processing the fine powder like sand through bleaching, before carrying out the step of processing.

The present disclosure further relates to a sand-made paper that comprises a fine powder like sand; and a solvent treated polymer obtained by treating a polymer with a solvent, wherein said solvent treated polymer is processed with said fine powder like sand optionally with a binder to yield said sand-made paper.

The present disclosure further relates to a sand-made paper comprising: a fine powder like sand; and a polymer; wherein said polymer is processed with said fine powder like sand to yield said sand-made paper.

The present disclosure further relates to a sand-made paper comprising: a fine powder like sand; a polymer; and a binder, wherein said polymer is processed with said fine powder like sand along with a binder to yield said sand-made paper.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 1A(a), FIG. 1A(b) and FIG. 1B illustrate exemplary flow diagrams for making sand made paper in accordance with an embodiment of the present disclosure.

DETAILED DESCRIPTION

The present disclosure as well as a preferred mode of use and advantages thereof will be best understood by referring to the following detailed description of an illustrative embodiment in conjunction with the accompanying figures.

If the specification states a component or feature "may", "can", "could", or "might" be included or have a characteristic, that particular component or feature is not required to be included or have the characteristic.

Although the present disclosure has been described with the purpose of manufacturing sand made paper, it should be appreciated that the same has been done merely to illustrate the invention in an exemplary manner and any other purpose or function for which explained methods and materials used and any variations and modifications of methods and materials falls within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of composition or structure).

Various terms as used herein are shown below. To the extent a term is not defined below, it should be given the broadest definition persons in the pertinent art have given that term as reflected in printed publications and issued patents at the time of filing.

The term "sand-made paper" as used herein refers to a paper made essentially from sand.

The term "fine powder like sand" refers to sand obtained after sieving so as to provide sand with mean particle size of less than 50 microns, preferably less than 32 microns and such sand resembles fine powder.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details.

The present disclosure relates to a sand-made paper and manufacturing method thereof, and more particularly to an eco-friendly sand-made paper and a method for making the same.

In an embodiment, the present disclosure relates to a method for making sand-made paper, the method including the steps of: treating a polymer with a solvent so as to obtain solvent treated polymer; and processing the solvent treated polymer with fine powder like sand optionally with a binder to yield the sand-made paper.

In an embodiment, the present disclosure relates to a method for making sand-made paper, the method including the steps of: treating a polymer with a solvent so as to obtain solvent treated polymer; and processing the solvent treated polymer with fine powder like sand to yield the sand-made paper.

In another embodiment, the present disclosure relates to a method for making sand-made paper, the method including the steps of: treating a polymer with a solvent so as to obtain solvent treated polymer; and processing the solvent treated polymer with fine powder like sand with a binder to yield the sand-made paper.

In an alternate embodiment, the method for preparing the sand-made paper comprises pelletizing and rolling of fine powder like sand and polymer to provide one or more sand-made paper sheet(s).

In another embodiment, the method for preparing the sand-made paper comprises pelletizing and rolling of fine powder like sand and polymer optionally with a binder to provide one or more sand-made paper sheet(s).

In an embodiment, the fine powder like sand can be obtained by sieving of naturally occurring sand, wherein the naturally occurring sand can be any or a combination of brown sand, white sand, grey sand, red sand or the like. In an embodiment the naturally occurring sand, can be any or a combination of brown sand, white sand, grey sand, and red sand. The naturally occurring sand may be sieved using a sieve having mesh of size of less than 50 microns, preferably less than 32 microns to provide find powder like sand.

In an embodiment, the polymer can be in a form selected from any or a combination of powdered polymer, processed polymer, and polymer pellets. In another embodiment, the polymer can be selected from any or a combination of polyethylene, and high density polyethylene (HDPE). In yet another embodiment, the solvent can be selected from any or a combination of toluene and acetone.

In one of the exemplary embodiment, the solvent can be toluene and the polymer can be powdered HDPE.

In an embodiment, the fine powder like sand and the solvent treated polymer can be processed in a ratio ranging from 80:20 to 30:70. In an exemplary implementation, the fine powder like sand and the solvent treated polymer can be processed in a ratio of around 50:50.

In an embodiment, the binder can be selected from any or a combination of polyvinyl alcohol, polyethersulfone, sorbitan monooleate, and silica.

In another embodiment, the method can further include the step of pre-processing the fine powder like sand through bleaching at an appropriate stage. In an embodiment, the bleaching of sand is carried out before carrying out the step of processing.

The present disclosure further relates to a sand-made paper that comprises fine powder like sand; and a solvent treated polymer obtained by treating a polymer with a solvent, wherein said solvent treated polymer is processed with said fine powder like sand optionally with a binder to yield said sand-made paper.

In an embodiment, the present disclosure relates to a sand-made paper that comprises fine powder like sand; and a solvent treated polymer obtained by treating a polymer with a solvent, wherein said solvent treated polymer is processed with said fine powder like sand to yield said sand-made paper.

In another embodiment, the present disclosure relates to a sand-made paper that comprises fine powder like sand; and a solvent treated polymer obtained by treating a polymer with a solvent, wherein said solvent treated polymer is processed with said fine powder like sand along optionally with a binder to yield said sand-made paper.

In an embodiment, the present disclosure further relates to a sand-made paper comprising: a fine powder like sand; and a polymer; wherein said polymer is processed with said fine powder like sand optionally with a binder to yield said sand-made paper.

In an embodiment, the present disclosure further relates to a sand-made paper comprising: a fine powder like sand; a polymer; and optionally a binder, wherein said polymer is processed with said fine powder like sand optionally with a binder to yield said sand-made paper.

Figure 1A:
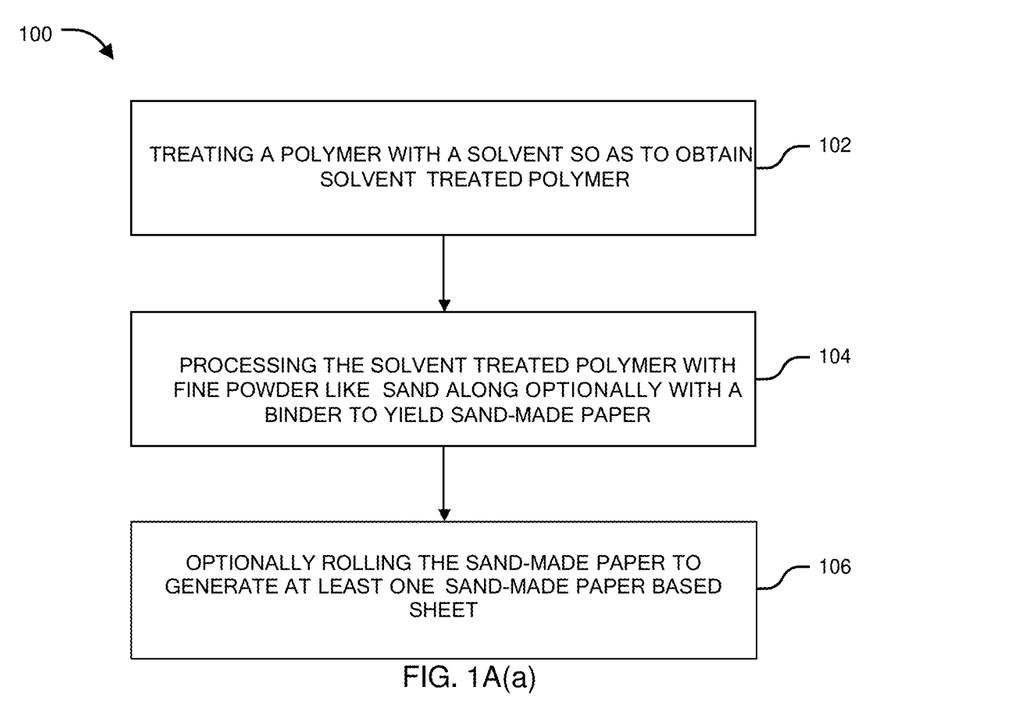
Figure 1B:
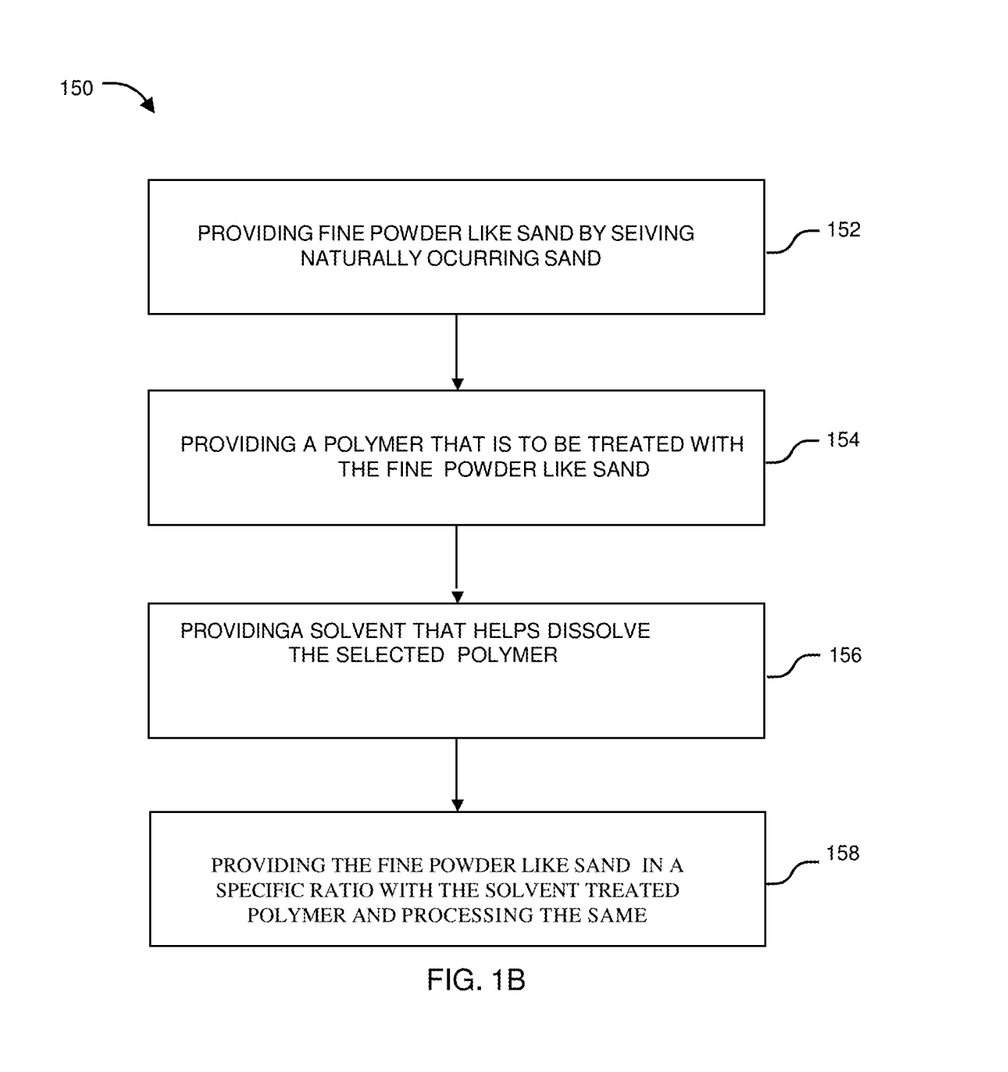

FIG. 1A(a), FIG. 1A(b) and FIG. 1B illustrate exemplary flow diagrams for manufacturing of sand made paper in accordance with an embodiment of the present disclosure. With reference to FIG. 1A(a), the method 100 of making sand-made paper can include, at step 102, treating a polymer with a solvent so as to obtain solvent treated polymer, and at step 104, processing the solvent treated polymer with fine powder like sand along optionally with a binder to yield the sand-made paper. Optionally, at step 106, the method can include rolling the sand-made paper to generate at least one sand-made paper based sheet.

With reference to FIG. 1A(b), in an alternate embodiment, the method 110 of making sand-made paper can include, at step 118, pelletizing and rolling fine powder like sand polymer optionally with a binder to provide at least one sand-made paper sheet.

Sand-made paper of the present disclosure can include a first component obtained by mixing fine powder like sand with a binding agent, and a second component obtained by treating a polymer with a solvent, such that the first and second components are then processed with each other in a specific ratio and further subjected to rolling to obtain desired sand-made paper.

Figure 2:
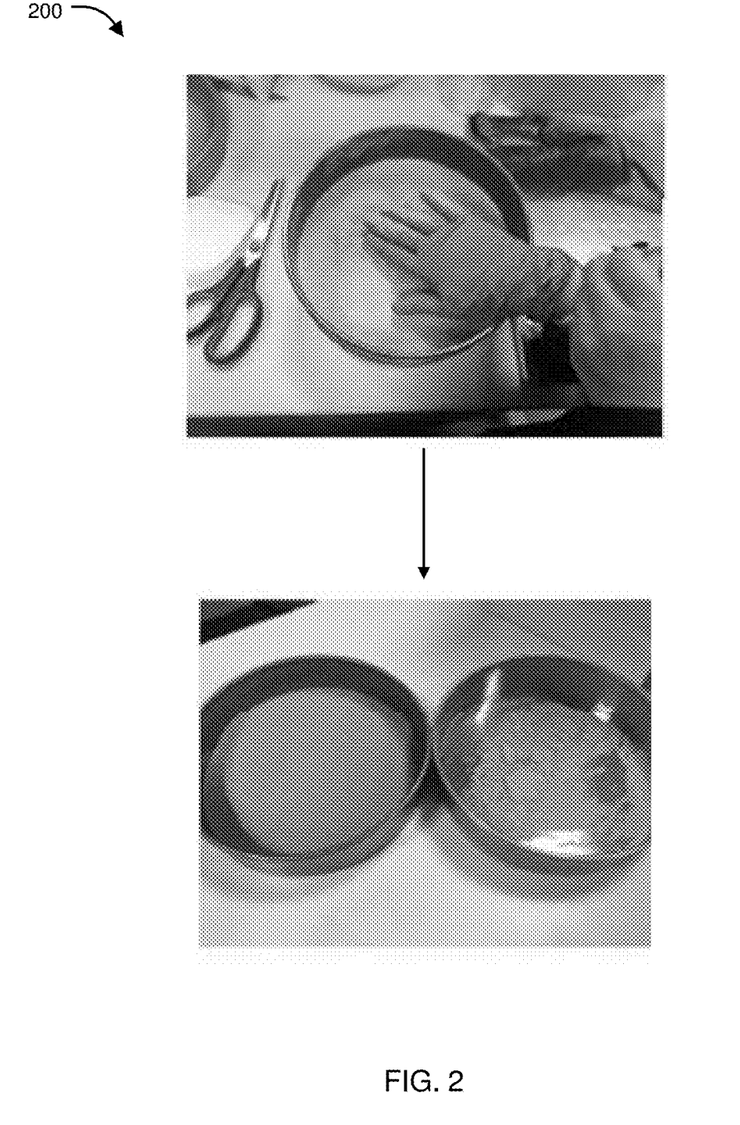
FIG. 2 illustrates an exemplary representation showing sieving of sand so as to obtain fine powder like sand in accordance with an embodiment of the present disclosure.

With reference to FIG. 1B, the proposed method 150 for making sand-made paper can include, at step 152, providing fine powder like sand by sieving of raw material that is naturally occurring sand through sieve having mesh size of less than 32 microns, optionally grinding sand in order to reduce the particle size and obtaining sand that is suitable for sieving, and further sieving the sand through sieve having mesh size selected from 25 microns, 22 microns, 20 microns, 25 microns, 10 microns, or 5 microns, to provide fine powder like sand of particle size that is suitable for sieving. In an embodiment, the step of sieving can be applied to ensure that the obtained powder like sand is fine, and is of desired particle size that gives optimal efficiency for subsequent steps of binding and processing with solvent treated polymer. In an exemplary aspect, the step of sieving 152 can be carried out using a suitably sieve with desired mesh size. In an exemplary embodiment, sieve with mesh sized used for the purpose of sieving can be of less than 32 microns mesh size, and in a specific embodiment, less than 5 microns. FIG. 2 illustrates an exemplary representation 200 showing sieving of raw (naturally occurring) sand so as to obtain fine powder like sand in accordance with an embodiment of the present disclosure.

The method 150 can further include, at step 154, providing a polymer that is to be treated with the fine powder like sand. In an embodiment, the polymer can be selected based on one or more attributes selected from any or a combination of response of polymer to heat, melting point, chemical change when exposed to heat, among other like parameters. As would be appreciated, polymers are typically categorized into thermoplastic and thermoset polymers, wherein thermoplastic polymers can be heated to their melting point, cooled, and reheated again without significant degradation, whereas thermoset polymers can only be heated once. Instead of burning, thermoplastic polymers liquefy, which allows them to be easily recycled, wherein heating causes thermoset materials to set resulting in a chemical change that cannot be reversed. In an embodiment, the present disclosure can be implemented using High density polyethylene (HDPE) as the polymer for treating with fine powder like sand.

In an aspect, HDPE of the present disclosure can be in the form of a powder, or can be processed HDPE, or can be in the form of pellets. It would be appreciated that although certain examples in the present disclosure would be given with respect to powdered HDPE, the same is not limiting the scope of the invention in any manner whatsoever.

In an aspect, the proposed method 150 can further include, at step 156, providing a solvent that can help dissolve HDPE/polymer, and obtain a flowable component. In an exemplary implementation, the solvent can be any or a combination of toluene and acetone. In another implementation, toluene can be used as a solvent along with powdered HDPE in order to enable an efficient solvent based polymer.

In an embodiment, the proposed method 150 can further include, at step 158, providing the powder like sand with polymer (HDPE for instance) in a specific ratio and processing the same. In an exemplary aspect, the fine powder like sand and the solvent treated polymer can be processed in a ratio ranging from 80:20 to 30:70. In another exemplary implementation, the fine powder like sand and the solvent treated polymer can be processed in a ratio of around 50:50.

As mentioned above, processing between powder like sand and polymer can be optionally performed in the presence of a binder, wherein the binder reduces the brittle nature of the sheets obtained. In an exemplary embodiment, silica and/or sorbitan monooleate (Span 80) can be selected as the binding agent/binder, wherein the binding agent can initially be added to sand powder prior to mixing with the solvent based polymer.

The following non limiting examples elucidate specific embodiments of the present invention.

EXAMPLES

Example 1

Preparing Sand-Made Paper and Comparison with $CaCO_3$-Made Paper

Figure 3A:
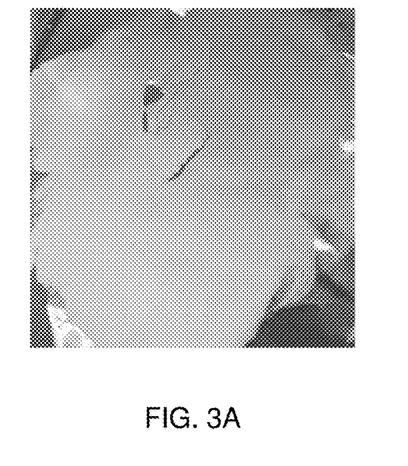
FIG. 3A, FIG. 3B and FIG. 3C illustrate exemplary representations showing final paper sheets obtained from varying ratios of $CaCO_3$ and polymer in accordance with an embodiment of the present disclosure, wherein the $CaCO_3$ is incorporated for comparison purpose.
Figure 3B:
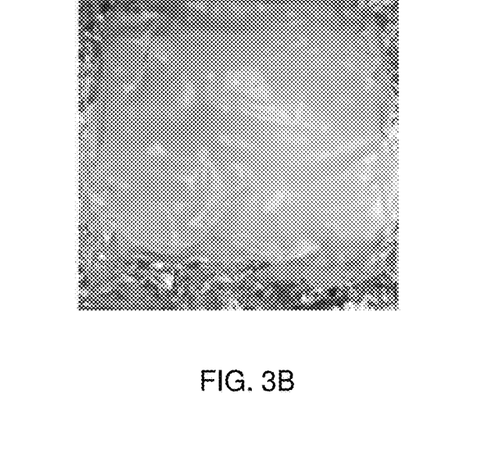
Figure 3C:
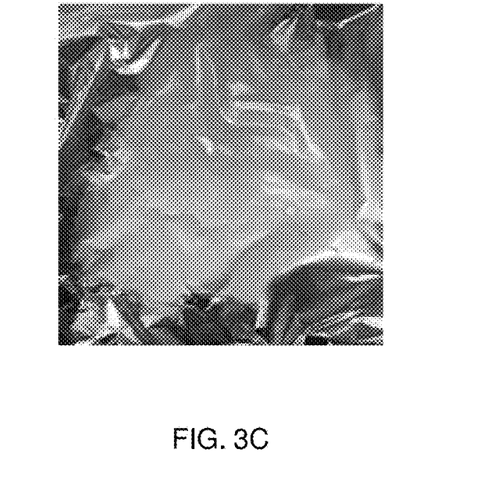

A. Comparative $CaCO_3$-made paper: FIGS. 3A-3C illustrate exemplary representations showing final paper sheets obtained from varying ratios of $CaCO_3$ and polymer in accordance with an embodiment of the present disclosure. In an experiment conducted, powdered HDPE was dissolved in toluene at temperature above 100° C. along with continuous stirring for 30 minutes. Powder like sand was then added to the solvent once dissolution was completed. The above composition was further heated and stirred until a homogenous composition is obtained. The composition obtained was then rolled into sheets and then cut to paper sheets, which in turn was heated in oven at 120° C. temperature, in order to have the final paper sheet. FIG. 3A shows a representation of $CaCO_3$ made paper composition when powder like $CaCO_3$ to HDPE ratio was 80:20, whereas FIG. 3B shows a representation of $CaCO_3$ made paper composition when powder like $CaCO_3$ to HDPE ratio was 50:50, and FIG. 3C shows a representation of $CaCO_3$ made paper composition when $CaCO_3$ to HDPE ratio was 30:70.

Figure 4:
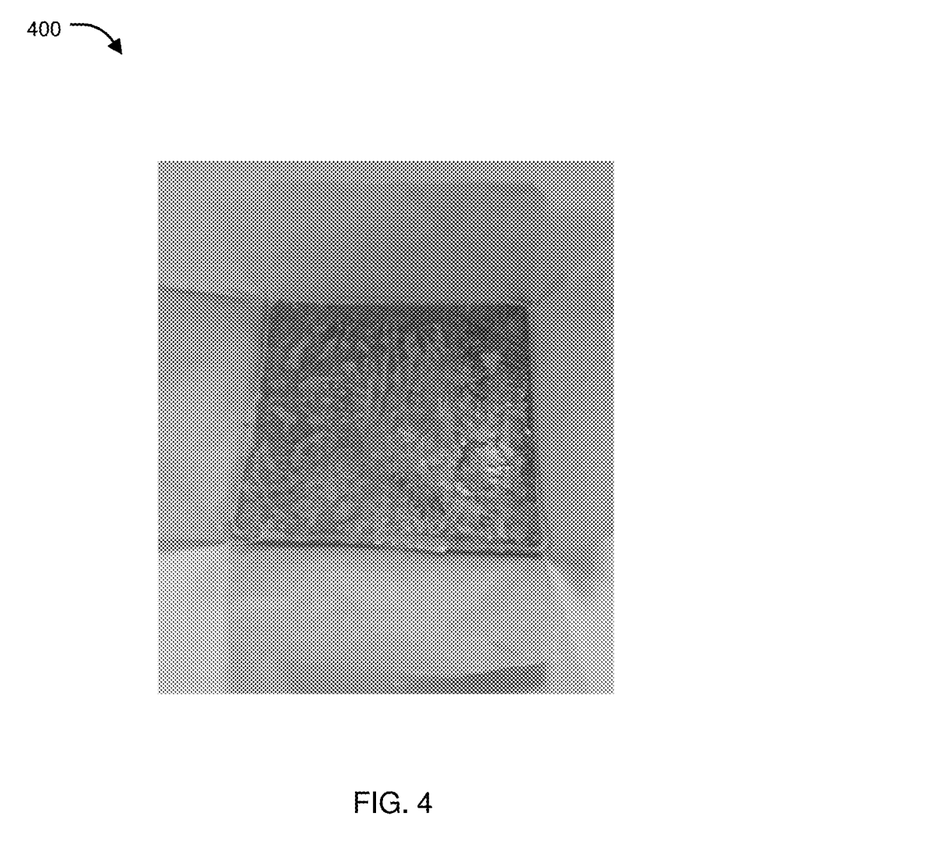
FIG. 4 illustrates an exemplary sand-made paper sheet obtained from the brown sand and HDPE in a ratio of 50:50 in accordance with an embodiment of the present disclosure.

B. Sand-made paper: FIG. 4 illustrates an exemplary sand-made paper sheet 400 obtained from brown sand to HDPE ratio of 50:50 in accordance with an embodiment of the present disclosure.

Figure 5A:
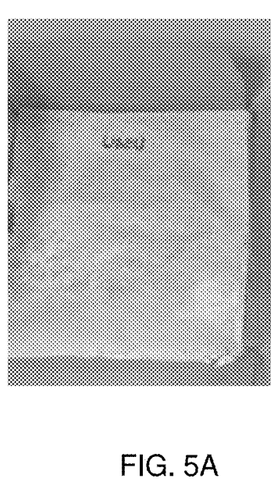
FIG. 5A and FIG. 5B illustrate comparison between 50:50 ratio of $CaCO_3$ with HDPE (comparative sheet 5A) and exemplary sand-made paper sheets obtained from 50:50 ratio of brown sand with HDPE (5B) in accordance with an embodiment of the present disclosure.
Figure 5B:
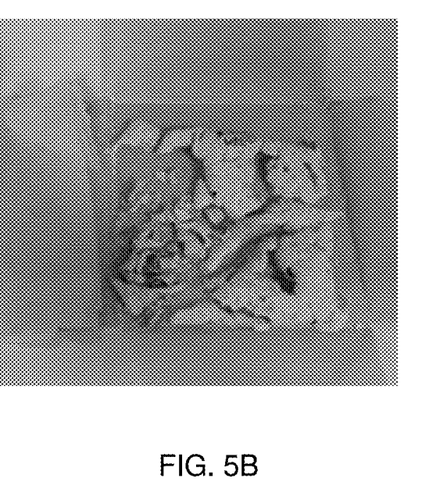

FIG. 5A illustrates comparative sheet prepared from 50:50 ratio of $CaCO_3$ to HDPE (5A) and FIG. 5B illustrates a sheet prepared from 50:50 ratio of brown sand to HDPE. It was also noted that sheet (FIG. 5B) obtained using HDPE and brown sand was brown and, compact. It was further noted from the tests that resulting paper sheet had texture though different from ordinary paper, but was comparable with sheet (FIG. 5A) prepared using $CaCO_3$ that were, somewhat writable, smooth, and to some extent flexible nature.

Example 2

Preparing Sand-Made Paper with Gradual Heating

Figure 6:
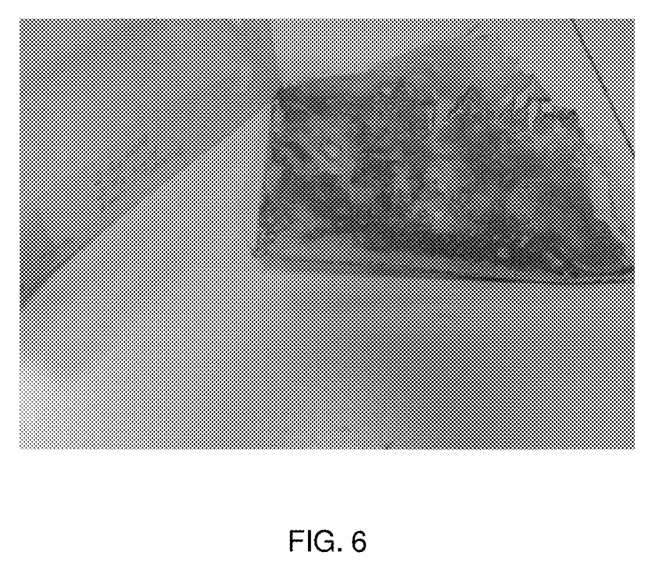
FIG. 6 illustrates an exemplary sand-made paper sheet obtained from the ratio 50:50 (brown sand:HDPE) obtained through gradual heating in accordance with an embodiment of the present disclosure.

The processing was conducted using the same procedure as mentioned above under Example 1, but with subjecting sheets to further gradual heating step. FIG. 6 shows the paper sheet resulted from one such exemplary processing.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

The invention claimed is:

1. A method of making sand-made paper, the method comprising the steps of:
    treating a polymer with a solvent so as to obtain solvent treated polymer;
    processing said solvent treated polymer with fine powder like sand optionally with a binder to yield said sand-made paper.

2. The method of claim 1, wherein the method further comprises the step of rolling said sand-made paper to provide one or more sand-made paper based sheet.

3. The method of claim 1, wherein said fine powder like sand has a mean particle size less than 32 microns.

4. The method of claim 1, wherein said fine powder like sand is obtained through sieving of naturally occurring sand.

5. The method of claim 4, wherein said naturally occurring sand is at least one of brown sand, white sand, grey sand and red sand.

6. The method of claim 1, wherein said polymer is in a form selected from at least one of powdered polymer, processed polymer, and polymer pellets.

7. The method of claim 1, wherein said polymer is selected from at least one of polyethylene, and high density polyethylene (HDPE).

8. The method of claim 1, wherein said solvent is selected from at least one of toluene and acetone.

9. The method of claim 1, wherein said solvent is toluene, and said polymer is powdered HDPE.

10. The method of claim 1, wherein said fine powder like sand and said solvent treated polymer are processed in a ratio ranging from 80:20 to 30:70.

11. The method of claim 1, wherein said fine powder like sand and said solvent treated polymer are processed in a ratio of around 50:50.

12. The method of claim 1, wherein said binder is selected from at least one of polyvinyl alcohol, polyether sulfone, sorbitan monooleate, and silica.

13. The method of claim 1, wherein said method further comprises the step of pre-processing said fine powder like sand by bleaching, prior to carrying out the step of processing.

14. A sand-made paper comprising:
a fine powder like sand; and
a solvent treated polymer obtained by treating a polymer with a solvent, wherein said solvent treated polymer is processed with said fine powder like sand optionally with a binder to yield said sand-made paper,
wherein said solvent is toluene and said polymer is selected from at least one of polyethylene and high density polyethylene (HDPE).

15. The sand-made paper of claim 14, wherein the sand-made paper is rolled to provide one or more sand-made paper sheet.

16. The sand-made paper of claim 14, wherein the fine powder like sand has a mean particle size less than 32 microns.

17. The sand-made paper of claim 14, wherein said fine powder like sand is obtained through sieving of naturally occurring sand.

18. The sand-made paper of claim 17, wherein said naturally occurring sand is at least one of brown sand, white sand, grey sand and red sand.

19. The sand-made paper of claim 14, wherein said polymer is in a form selected from at least one of the powdered polymer, processed polymer, and polymer pellets.

20. The sand-made paper of claim 14, wherein said solvent is selected from at least one of the toluene and acetone.

21. The sand-made paper of claim 14, wherein said polymer is powdered HDPE.

22. The sand-made paper of claim 14, wherein said fine powdered sand and said solvent treated polymer are processed in a ratio ranging from 80:20 to 30:70.

23. The sand-made paper of claim 14, wherein said fine powdered sand and said solvent treated polymer are processed in a ratio of around 50:50.

24. The sand-made paper of claim 14, wherein said binder is selected from at least one of polyvinyl alcohol, polyethersulfone, sorbitan monooleate, and silica.

* * * * *